United States Patent
Jeng et al.

(10) Patent No.: US 11,118,082 B2
(45) Date of Patent: Sep. 14, 2021

(54) COMPOSITION, INSULATING MATERIAL, AND METHOD FOR PREPARING AN INSULATING MATERIAL

(71) Applicant: INDUSTRIAL TECHNOLOGY RESEARCH INSTITUTE, Hsinchu (TW)

(72) Inventors: Jyh-Long Jeng, New Taipei (TW); Jeng-Yu Tsai, Chiayi (TW); Yen-Yi Chu, Chiayi (TW); Wei-Ta Yang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 225 days.

(21) Appl. No.: 16/232,766

(22) Filed: Dec. 26, 2018

(65) Prior Publication Data
US 2019/0203067 A1   Jul. 4, 2019

Related U.S. Application Data

(60) Provisional application No. 62/611,772, filed on Dec. 29, 2017.

(51) Int. Cl.
| C09D 145/00 | (2006.01) |
| C09D 4/06 | (2006.01) |
| H01B 3/44 | (2006.01) |
| C08F 299/00 | (2006.01) |

(52) U.S. Cl.
CPC .......... *C09D 145/00* (2013.01); *C08F 299/00* (2013.01); *C09D 4/06* (2013.01); *H01B 3/441* (2013.01); *H01B 3/447* (2013.01); *H01B 3/448* (2013.01)

(58) Field of Classification Search
CPC ........... C09D 145/00; C09D 4/06; H01B 3/44
USPC .......................................................... 522/7
See application file for complete search history.

(56) References Cited

U.S. PATENT DOCUMENTS

| 6,369,143 B1 | 4/2002 | Park et al. |
| 6,710,148 B2 | 3/2004 | Harada et al. |
| 6,777,157 B1 | 8/2004 | Barclay et al. |
| 6,824,955 B2 | 11/2004 | Harada et al. |
| 6,849,381 B2 | 2/2005 | Barclay et al. |
| 6,864,037 B2 | 3/2005 | Hatakeyama et al. |
| 6,936,402 B2 | 8/2005 | Kim et al. |
| 7,186,773 B2 | 3/2007 | Araki et al. |
| 7,649,118 B2 | 1/2010 | Araki et al. |
| 8,030,425 B2 | 10/2011 | Apanius et al. |
| 8,580,477 B2 | 11/2013 | Knapp et al. |
| 8,822,130 B2 | 9/2014 | Cho et al. |
| 8,986,923 B2 | 3/2015 | Knapp et al. |
| 9,223,214 B2 | 12/2015 | Cho et al. |
| 9,405,189 B2 | 8/2016 | Cho et al. |
| 2004/0214103 A1 | 10/2004 | Araki et al. |
| 2005/0192409 A1 | 9/2005 | Rhodes et al. |
| 2007/0129576 A1 | 6/2007 | Araki et al. |
| 2009/0189277 A1 | 7/2009 | Apanius et al. |
| 2011/0070543 A1 | 3/2011 | Knapp et al. |
| 2014/0038112 A1 | 2/2014 | Knapp et al. |
| 2014/0141375 A1 | 5/2014 | Cho et al. |
| 2014/0141376 A1 | 5/2014 | Cho et al. |
| 2015/0072292 A1 | 3/2015 | Cho et al. |
| 2015/0079506 A1 | 3/2015 | Kandanarachchi et al. |

FOREIGN PATENT DOCUMENTS

| CN | 1221969 A | 7/1999 |
| CN | 100346229 C | 10/2007 |
| CN | 101044185 B | 7/2012 |
| CN | 103370347 B | 8/2016 |
| CN | 106916251 A | 7/2017 |
| JP | 2001-33964 A | 2/2001 |
| JP | 2003-122008 A | 4/2003 |

(Continued)

OTHER PUBLICATIONS

Bielawski et al., Synthesis of End-Functionalized Poly(norbornene)s via Ring-Opening Metathesis Polymerization, 2001, Macromolecules, 34, pp. 8610-8618 (Year: 2001).*

Matsumoto et al., "Synthesis of Photosensitive and Thermosetting Poly(phenylene ether) Based on Poly[2,6-di(3-methyl-2-butenyl)phenol-co-2,6-dimethyl-phenol] and a Photoacid Generator", Journal of polymer science Part A: Polymer Chemistry, vol. 43, Nov. 2005, pp. 149-156.

Mizoguchi et al., "Negative-type photosensitive poly (phenylene ether) based on poly(2,6-dimethyl-1,4-phenylene ether), a crosslinker, and a photoacid generator", Journal of Polymer Science Part A: Polymer Chemistry, vol. 46, Jul. 2008, pp. 4949-4958.

(Continued)

*Primary Examiner* — Deve V Hall
(74) *Attorney, Agent, or Firm* — Birch, Stewart, Kolasch & Birch, LLP

(57) ABSTRACT

A composition, an insulating material, and a method for preparing an insulating material are provided. The composition includes (a) 100 parts by weight of oligomer of Formula (I)

Formula (I)

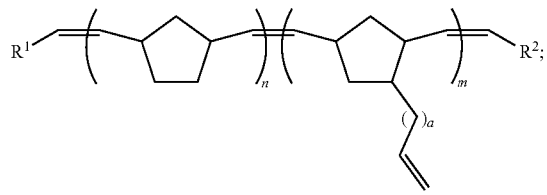

(b) 20-50 parts by weight of polymer having at least two reactive functional groups, wherein the reactive functional group is a reactive-double-bond-containing functional group; (c) 1-5 parts by weight of photoinitiator; (d) 0.5-2 parts by weight of thermal initiator; and (e) 0.5-2 parts by weight of photoacid generator.

20 Claims, No Drawings

(56) References Cited

FOREIGN PATENT DOCUMENTS

| | | | |
|---|---|---|---|
| JP | 2015-140364 A | | 8/2015 |
| TW | 594410 B | | 6/2004 |
| TW | 200640980 | | 12/2006 |
| TW | 200923031 | | 6/2009 |
| TW | I574607 B | | 3/2017 |
| TW | 201741361 A | * | 12/2017 |

OTHER PUBLICATIONS

Mizoguchi et al., "Negative-Working Photosensitive Poly (phenylene ether) Based on Poly(2,6-dimethyl-1,4-phenylene ether), a Cross-Linker, and a Photoacid Generator", Macromolecules, vol. 43, Feb. 2, 2010, pp. 2832-2839.

Rehab, "Negative Photoresist Materials Based on Poly(Norbornene Derivatives-co-styrene-co-maleic Anhydride)", Journal of Macromolecular Science Part A: Pure and Applied Chemistry, 42, 2005, pp. 327-339.

Tanabe et al., "Solution-Processed Photosensitive Passivation Layer for an a-Si TFT for LCDs with a Low Dielectric Constant", IEICE Transactions on Electronics, vol. E95-C, Nov. 2012, pp. 1737-1743.

Taiwanese Office Action and Search Report for Taiwanese Application No. 107147192, dated Nov. 28, 2019.

* cited by examiner

COMPOSITION, INSULATING MATERIAL, AND METHOD FOR PREPARING AN INSULATING MATERIAL

CROSS REFERENCE TO RELATED APPLICATIONS

This application claims the benefit of U.S. Provisional Application No. 62/611,772, filed on Dec. 29, 2017, which is hereby incorporated by reference herein.

TECHNICAL FIELD

The disclosure relates to a composition, an insulating material, and method for preparing the insulating material.

BACKGROUND

New generations of electronic products stress the advantages of being light, thin, short and small, and suitable for high-frequency transmission. Thus the layout of printed circuit boards (PCB) is geared towards high density with more rigorous requirements for the choice of printed circuit board (PCB) material. High-frequency electronic components are connected to the printed circuit board (PCB).

It is of urgent necessity for a high-frequency device to enable high-frequency operation in the field of electronic components, and therefore electronic component-related materials, such as insulating materials with low dielectric constant and low dielectric dissipation factor, have recently been required. Furthermore, in order to improve the solder resistance and increase the integration density of electronic components, insulating materials, which exhibit high thermal stability and enable patternability simultaneously have been also required. However, conventional insulating resin materials are apt to cause signal delay or loss in high frequency applications due to the high dielectric constant and dielectric dissipation factor of epoxy resin. In particular, it is important to maintain the signal transmission speed and quality for high frequency communication and computing electronic products.

Accordingly, a novel material, having improved dielectric constant and dielectric dissipation factor, for printed circuit boards is desired.

SUMMARY

According to embodiments of the disclosure, the composition includes (a) 100 parts by weight of oligomer of Formula (I); (b) 20-50 parts by weight of polymer having at least two reactive functional groups; (c) 1-5 parts by weight of photoinitiator; (d) 0.5-2 parts by weight of thermal initiator; and (e) 0.5-2 parts by weight of photoacid generator.

The oligomer of the disclosure has a structure of Formula (I)

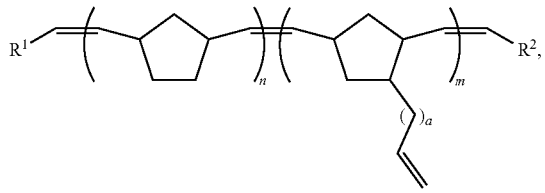

Formula (I)

wherein $R^1$ and $R^2$ are independently hydrogen or

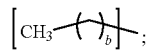

$R^1$ is not hydrogen when $R^2$ is hydrogen; a is 0 or 1; b is 0, 1, 2, 3, 4, 5, or 6; n≥5; m≥1; and the repeat unit

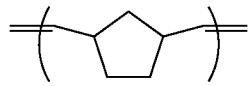

and the repeat unit

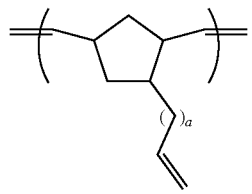

are arranged in a random or block fashion.

According to embodiments of the disclosure, an insulating material, which is a cured product of the aforementioned composition, is provided.

According to embodiments of the disclosure, a method for preparing an insulating material is provided. The method includes: subjecting the aforementioned composition to a coating process to form a coating; subjecting the coating to a first thermal treatment; irradiating the coating with a light source; and subjecting the coating to a second thermal treatment after irradiation.

A detailed description is given in the following embodiments.

DETAILED DESCRIPTION

In the following detailed description, for the purposes of explanation, numerous specific details are set forth in order to provide a thorough understanding of the disclosed embodiments. It will be apparent, however, that one or more embodiments may be practiced without these specific details.

The disclosure provides a composition, an insulating material, and a method for preparing the insulating material.

Since the composition includes an oligomer with a specific structure, polymer having at least two reactive functional groups, photoinitiator, thermal initiator, and photoacid generator simultaneously, the cured product of the composition can exhibits a relatively low dielectric constant (Dk) (less than 2.6 (at 60 GHz)) and a relatively low dissipation factor (Df) (less than 0.0088 (at 10 GHz)), and can serve as a good material for the high-frequency substrate in order to improve the patternability (patterns having high-resolution) and solder resistance.

According to embodiments of the disclosure, the composition includes (a) 100 parts by weight of oligomer of Formula (I)

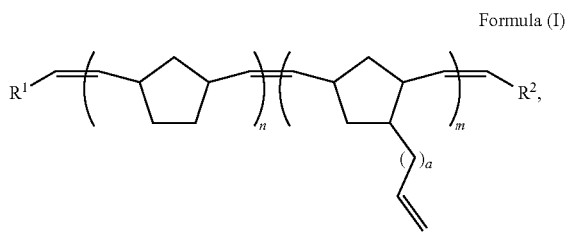

Formula (I)

wherein $R^1$ and $R^2$ are independently hydrogen or

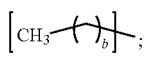

$R^1$ is not hydrogen when $R^2$ is hydrogen; a is 0 or 1; b is 0, 1, 2, 3, 4, 5, or 6; n≥5; m≥1; and the repeat unit

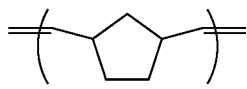

and the repeat unit

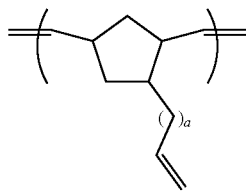

are arranged in a random or block fashion; (b) 20-50 parts by weight of polymer having at least two reactive functional groups, wherein the reactive functional group is a reactive-double-bond-containing functional group; (c) 1-5 parts by weight of photoinitiator; (d) 0.5-2 parts by weight of thermal initiator; and (e) 0.5-2 parts by weight of photoacid generator.

According to embodiments of the disclosure, when the amount of the polymer having at least two reactive functional groups is too high, the cured product of the composition exhibits poor thermal resistance. When the amount of the polymer having at least two reactive functional groups is too low, the composition cannot be used to form a patterned film. According to embodiments of the disclosure, when the amount of the photoinitiator is too low, the coating of the composition cannot be cured after irradiation with a light source. According to embodiments of the disclosure, when the amount of the thermal initiator is too low, the cured product of the composition exhibits a poor flexibility, a relatively high dielectric constant (Dk) and a relatively high dissipation factor (Df). Furthermore, when the amount of the thermal initiator or the amount of the photoacid generator is too low, the composition has a relatively high curing temperature.

According to embodiments of the disclosure, the oligomer has a number-average molecular weight from about 1,000 to 5,000, such as 1,000, 1,500, 2,000, 2,500, 3,000, 3,500, 4,000, 4,500, or 5,000. When the number-average molecular weight of the oligomer is too low, the cured product of the composition exhibits poor thermal stability. When the amount of the number-average molecular weight of the oligomer is too high, the composition cannot be used to form a patterned film.

According to embodiments of the disclosure, the ratio of n to m (n:m) is from about 95:5 to 50:50, such as from 90:10 to 50:50, from 80:20 to 50:50, from 70:30 to 50:50, or from 60:40 to 50:50. When the ratio of n to m is too high, the cured product of the composition exhibits a relatively high dielectric constant (Dk) and a relatively high dissipation factor (Df) due to the residual vinyl group of the oligomer after curing. When the ratio of n to m is too low, the cured product of the composition exhibits a poor solder resistance due to the poor crosslinking density.

According to embodiments of the disclosure, m of Formula (I) can be from 1 to 25, and n of Formula (I) can be from 5 to 40. According to embodiments of the disclosure, m of Formula (I) can be 1, 2, 3, 4, 5, 6, 7, 8, 9, 10, 11, 12, 13, 14, 15, 16, 17, 18, 19, 20, 21, 22, 23, 24, or 25; and n of Formula (I) can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40.

According to embodiments of the disclosure, $R^1$ and $R^2$ are independently hydrogen, methyl, ethyl, n-propyl, n-butyl, n-pentyl, or n-hexyl; and $R^1$ is not hydrogen when $R^2$ is hydrogen.

According to embodiments of the disclosure, the polymer has at least two reactive functional groups, wherein the reactive functional group can be a reactive-double-bond-containing functional group. The polymer having at least two reactive functional groups can be polyether having at least two reactive functional groups, polynorbornene having at least two reactive functional groups, polyphenylene ether having at least two reactive functional groups, polypropylene having at least two reactive functional groups, polybutadiene having at least two reactive functional groups, or a combination thereof. According to embodiments of the disclosure, the polymer having at least two reactive functional groups has a number-average molecular weight from about 1,000 to 200,000, such as 3,000, 5,000, 10,000, 20,000, 50,000, 80,000, 100,000, 120,000, or 150,000.

According to embodiments of the disclosure, the reactive functional group is acryloyl group, allyl group, vinylbenzyl group, methylacryloyl group, propargyl group, cyanoallyl group, or a combination thereof.

According to embodiments of the disclosure, the polymer having at least two reactive functional groups is polyphenylene ether having at least two methylacryloyl groups, polyphenylene ether having at least two vinylbenzyl groups, or polybutadiene having at least two acryloyl groups.

According to embodiments of the disclosure, the photoinitiator is benzoin-based compound, acetophenone-based compound, thioxanthone-based compound, ketal compound, benzophenone-based compound, α-aminoacetophenone compound, acylphosphineoxide compound, biimidazole-based compound, triazine-based compound, or a combination thereof.

According to embodiments of the disclosure, the benzoin-based compound, for example, is benzoin, benzoin methyl ether, benzyl dimethyl ketal, or other suitable benzoin compound. The acetophenone-based compound, for example, is p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthiophenyl)-2-morpholino-1-propanone, 2-benzyl-2-N,N-dimethylamino-1-(4-morpholinophenyl-1-butanone. The benzophenone-based compound, for example, is benzophenone, 4,4- bis(dimethylamino)benzophenone, 4,4-bis(diethylamino) benzophenone, 2,4,6-trimethylaminobenzophenone, methyl-o-benzoyl benzoate, 3,3-dimethyl-4-methoxybenzophenone, or 3,3,4,4-tetra(t-butylperoxycarbonyl)benzophenone. The thioxanthone-based compound, for example, is thioxanthone, 2,4-diethyl-thioxanthanone, or thioxanthone-4-sulfone. The biimidazole-based compound is, for example, is 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methylphenyl)-4,4',5,5'-tetraphenyl-biimidazole, 2,2'-bis(o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5, 5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, or 2,2'-bis(2,4-dichlorophenyl)-4,4',5,5'-tetraphenyl-biimidazole. The acylphosphineoxide compound, for example, is 2,4,6-trimethylbenzoyl diphenylphosphine oxide) or bis(2, 6-dimethoxybenzoyl)-2,4,4-trimethylpentylphosphine oxide). The triazine-based compound, for example, is 3-{4-[2,4-bis(trichloromethyl)-s-triazine-6-yl] phenylthio}propionic acid, 1,1,1,3,3,3-hexafluoroisopropyl-3-{4-[2,4-bis(trichloromethyl)-s-triazine-6-yl] phenylthio}propionate, ethyl-2-{4-[2,4-bis (trichloromethyl)-s-triazine-6-yl]phenylthio}acetate, 2-epoxyethyl-2-{4-[2,4-bis(trichloromethyl)-s-triazine-6-yl]phenylthio}acetate, cyclohexyl-2-{4-[2,4-bis(trichloromethyl)-s-triazine-6-yl]phenylthio}acetate, benzyl-2-{4-[2,4, 4-bis(trichloromethyl)-s-triazine-6-yl]phenylthio}acetate, 3-{chloro-4-[2,4-bis(trichloromethyl)-s-triazine-6-yl] phenylthio}propionic acid, 3-{4-[2,4-bis(trichloromethyl)-s-triazine-6-yl]phenylthio}propionamide, 2,4-bis(trichloromethyl)-6-p-methoxystyryl-s-triazine, 2,4-bis (trichloromethyl)-6-(1-p-dimethylaminophenyl)-1,3,-butadienyl-s-triazine, or 2-trichloromethyl-4-amino-6-p-methoxystyryl-s-triazine.

According to embodiments of the disclosure, the thermal initiator is azo compound, cyanovaleric-acid-based compound, peroxide, or a combination thereof. The azo compound, for example, is 2,2'-azobis(2,4-dimethyl valeronitrile), dimethyl 2,2'-azobis(2-methylpropionate), 2,2-azobisisobutyronitrile (AIBN), 2,2-azobis(2-methylisobutyronitrile, 1,1'-azobis(cyclohexane-1-carbonitrile), 2,2'-azobis[N-(2-propenyl)-2-methylpropionamide], 1-[(cyano-1-methylethyl)azo] formamide, 2,2'-azobis(N-butyl-2-methylpropionamide), 2,2'-azobis(N-cyclohexyl-2-methylpropionamide), or other suitable azo compound. The peroxide, for example, is benzoyl peroxide, 1,1-bis(tert-butylperoxy)cyclohexane, 2,5-bis (tert-butylperoxy)-2,5-dimethylcyclohexane, 2,5-bis(tert-butylperoxy)-2,5-dimethyl-3-cyclohexyne, bis(1-(tert-butylperorxy)-1-methy-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, or other suitable peroxide.

The photoacid generator (PAG) of the disclosure may be activated through an irradiation with a wavelength of about 190 nm to about 430 nm. According to embodiments of the disclosure, the photoacid generator is ionic photoacid generator, non-ionic photoacid generator, polymeric photoacid generator, or a combination thereof. According to embodiments of the disclosure, the photoacid generator is onium salt, selenium salt, phosphonium salt, iodinium, sulfonium salt, organic halogen compound, O-nitrobenzylsulfonate compound, N-iminosulfonate compound, N-imidosulfonate compound, diazosulfonate compound, sulfonamide compound, diazodisulfonate compound, disulfone compound, or a combination thereof.

According to embodiments of the disclosure, the photoacid generator is tri phenyl sulfonium triflate, tri phenyl sulfonium antimonate, diphenyliodonium triflate, diphenyliodonium antimonate, methoxydiphenyliodonium triflate, di-t-butyldiphenyliodonium triflate, 2,6-dinitrobenzyl sulfonate, pyrogallol tris(alkylsulfonates), N-hydroxysuccinimide triflate, norbornene-dicarboximide-triflate, triphenylsulfonium nonaflate, diphenyliodonium nonaflate, methoxydiphenyliodonium nonaflate, di-t-butyldiphenyliodonium nonaflate, N-hydroxysuccinimide nonaflate, norbornene-dicarboximide-nonaflate, triphenyl sulfonium perfluorobutanesulfonate, triphenyl sulfonium perfluorooctanesulfonate, diphenyliodonium perfluorooctanesulfonate, methoxydiphenyl iodonium, di-t-butyl diphenyliodonium triflate, N-hydroxysuccinimide perfluorooctanesulfonate, norbornene-dicarboximide perfluorooctanesulfonate, or a combination thereof.

According to embodiments of the disclosure, the composition further includes (f) solvent, wherein (a) oligomer of Formula (I), (b) polymer having at least two reactive functional groups, (c) photoinitiator, (d) thermal initiator, and (e) photoacid generator are uniformly dispersed in the solvent. According to embodiments of the disclosure, the solvent includes acetone, methyl ethyl ketone, 1-methoxy-2-propanol, 1,2-propanediol monomethyl ether acetate, toluene, xylene, dimethyl formamide (DMF), N-methyl-2-pyrrolidone (NMP), dimethyl sulfoxide (DMSO), or a combination thereof.

According to embodiments of the disclosure, the disclosure provides an insulating material which is a cured product of the aforementioned composition.

According to embodiments of the disclosure, a method for preparing the insulating material is provided. The method includes: subjecting the aforementioned composition to a coating process to form a coating on a substrate; subjecting the coating to a first thermal treatment; irradiating the coating with a light source; and subjecting the coating to a second thermal treatment after irradiation. According to embodiments of the disclosure, the coating process is spin coating, bar coating, blade coating, roller coating, dip coating, spray coating, or brush coating. According to embodiments of the disclosure, the first thermal treatment has a temperature from about 70° C. to 120° C., such as 80° C., 90° C., 100° C., or 110. According to embodiments of the disclosure, the light source has a wavelength from 190 nm to 430 nm, such as 200 nm, 230 nm, 270 nm, 300 nm, 330 nm, 350 nm, or 380 nm. The light source can be X-ray, electron beam ray, UV ray, visible light ray or another source of light that can supply actinic rays. According to embodiments of the disclosure, the first thermal treatment has a temperature from 100 to 250° C., such as 120° C., 150° C., 180° C., or 210° C. According to embodiments of the disclosure, the method for preparing an insulating material can further include subjecting the coating to a developing process after irradiation. According to embodiments of the disclosure, the developing process employs a developer, wherein the developer is cyclopentaonoe, N-methyl-2-pyrrolidone, toluene, or a combination thereof. According to embodiments of the disclosure, the substrate can be a glass fiber, or a copper foil.

According to embodiments of the disclosure, the composition of the disclosure can be applied in the fabrication of copper clad laminates and/or printed circuit boards. Furthermore, the composition of the disclosure can serve as an adhesive, coating, packaging, composite material, or functional film and can be used in various optical and electronic products.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity.

EXAMPLES

Preparation of Oligomer

Preparation Example 1

0.045 g of 1,3-bis(2,4,6-trimethylphenyl)-4,5-dihydro-imidazol-2-ylidene[2-(i-propoxy)-5-(N,N-dimethylamino-sulfonyl) phenyl]methyleneruthenium (II) dichloride (as metal catalyst) was added into a reaction bottle under nitrogen atmosphere, and then 10 ml of toluene was added into the reaction bottle, obtaining a metal-catalyst-containing solution. After the metal catalyst was dissolved in toluene completely, 0.604 mol of 1-hexene (as α-olefin), 73.6 g of vinyl norbornene, 128 ml of toluene, and the metal-catalyst-containing solution were added into another reaction bottle. After stirring completely, a norbornene-containing solution (57.7 g of norbornene (NB) dissolved in 50 ml of toluene) was added into the reaction bottle. Herein, α-olefin (1-hexene) had a molar percentage of 50 mol %, based on the total moles of vinyl norbornene and norbornene. After stopping the reaction, 63 ml of ethyl vinyl ether was added into the reaction bottle. After stirring overnight, the catalyst of the result was removed and then was purified by a reprecipitation with methanol. After concentration, Oligomer (I) was obtained, wherein the ratio of the repeat unit

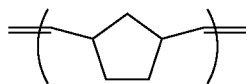

to the repeat unit

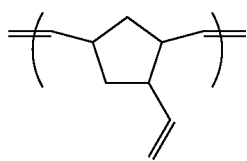

was about 1:1.

Next, the number average molecular weight (Mn) of Oligomer (I) was determined, and the result is shown in Table 1.

Preparation Example 2

0.045 g of 1,3-Bis(2,4,6-trimethylphenyl)-4,5-dihydro-imidazol-2-ylidene[2-(i-propoxy)-5-(N,N-dimethylamino-sulfonyl) phenyl]methyleneruthenium (II) dichloride (as metal catalyst) was added into a reaction bottle under nitrogen atmosphere, and then 10 ml of toluene was added into the reaction bottle, obtaining a metal-catalyst-containing solution. After the metal catalyst was dissolved in toluene completely, 0.362 mol of 1-hexene (as α-olefin), 73.6 g of vinyl norbornene (VNB), 128 ml of toluene, and the metal-catalyst-containing solution were added into another reaction bottle. After stirring completely, a norbornene-containing solution (57.7 g of norbornene (NB) dissolved in 50 ml of toluene) was added into the reaction bottle. Herein, α-olefin (1-hexene) had a molar percentage of 30 mol %, based on the total moles of vinyl norbornene and norbornene. After stopping the reaction, 63 ml of ethyl vinyl ether was added into the reaction bottle. After stirring overnight, the catalyst of the result was removed and then was purified by a reprecipitation with methanol. After concentration, Oligomer (II) was obtained, wherein the ratio of the repeat unit

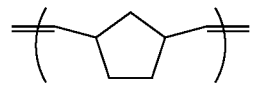

to the repeat unit

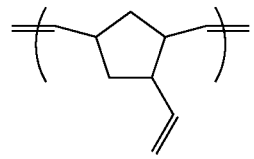

was about 1:1.

Next, the number average molecular weight (Mn) of Oligomer (II) was determined, and the result is shown in Table 1.

Preparation Example 3

0.054 g of 1,3-Bis(2,4,6-trimethylphenyl)-4,5-dihydro-imidazol-2-ylidene[2-(i-propoxy)-5-(N,N-dimethylamino-sulfonyl) phenyl]methyleneruthenium (II) dichloride (as metal catalyst) was added into a reaction bottle under nitrogen atmosphere, and then 15 ml of toluene was added into the reaction bottle, obtaining a metal-catalyst-containing solution. After the metal catalyst was dissolved in toluene completely, 0.145 mol of 1-hexene (α-olefin), 88.3 g of vinyl norbornene (VNB), 150 ml of toluene, and the metal-catalyst-containing solution were added into another reaction bottle. After stirring completely, a norbornene-containing solution (69.3 g of norbornene (NB) dissolved in 60 ml of toluene) was added into the reaction bottle. Herein, α-olefin (1-hexene) had a molar percentage of 10 mol %, based on the total moles of vinyl norbornene and norbornene. After stopping the reaction, 75 ml of ethyl vinyl ether was added into the reaction bottle. After stirring overnight, the catalyst of the result was removed and then was purified by a reprecipitation with methanol. After concentration, Oligomer (III) was obtained, wherein the ratio of the repeat unit

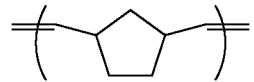

to the repeat unit

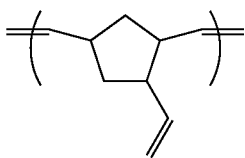

was about 1:1.

Next, the number average molecular weight (Mn) of Oligomer (III) was determined, and the result is shown in Table 1.

Preparation Example 4

0.018 g of 1,3-Bis(2,4,6-trimethylphenyl)-4,5-dihydro-imidazol-2-ylidene[2-(i-propoxy)-5-(N,N-dimethylamino-sulfonyl) phenyl]methyleneruthenium (II) dichloride (as metal catalyst) was added into a reaction bottle under nitrogen atmosphere, and then 15 ml of toluene was added into the reaction bottle, obtaining a metal-catalyst-containing solution. After the metal catalyst was dissolved in toluene completely, 0.0245 mol of 1-hexene (α-olefin), 29.4 g of vinyl norbornene (VNB), 45 ml of toluene, and the metal-catalyst-containing solution were added into another reaction bottle. After stirring completely, a norbornene-containing solution (23.06 g of norbornene (NB) dissolved in 20 ml of toluene) was added into the reaction bottle. Herein, α-olefin (1-hexene) had a molar percentage of 5 mol %, based on the total moles of vinyl norbornene and norbornene. After stopping the reaction, 25 ml of ethyl vinyl ether was added into the reaction bottle. After stirring overnight, the catalyst of the result was removed and then was purified by a reprecipitation with methanol. After concentration, Oligomer (IV) was obtained, wherein the ratio of the repeat unit

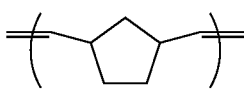

to the repeat unit

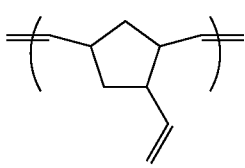

was about 1:1.

Next, the number average molecular weight (Mn) of Oligomer (IV) was determined, and the result is shown in Table 1.

Preparation Example 5

0.0018 g of 1,3-Bis(2,4,6-trimethylphenyl)-4,5-dihydro-imidazol-2-ylidene[2-(i-propoxy)-5-(N,N-dimethylamino-sulfonyl) phenyl]methyleneruthenium (II) dichloride (as metal catalyst) was added into a reaction bottle under nitrogen atmosphere, and then 1 ml of toluene was added into the reaction bottle, obtaining a metal-catalyst-containing solution. After the metal catalyst was dissolved in toluene completely, 0.0005 mol of 1-hexene (α-olefin), 3 g of vinyl norbornene (VNB), 4.5 ml of toluene, and the metal-catalyst-containing solution were added into another reaction bottle. After stirring completely, a norbornene-containing solution (2.36 g of norbornene (NB) dissolved in 2 ml of toluene) was added into the reaction bottle. Herein, α-olefin (1-hexene) had a molar percentage of 1 mol %, based on the total moles of vinyl norbornene and norbornene. After stopping the reaction, 2.5 ml of ethyl vinyl ether was added into the reaction bottle. After stirring overnight, the catalyst of the result was removed and then was purified by a reprecipitation with methanol. After concentration, Oligomer (V) was obtained, wherein the ratio of the repeat unit

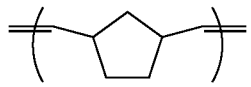

to the repeat unit

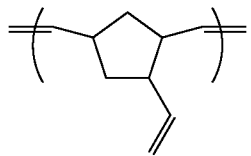

was about 1:1.

After concentration, Oligomer (V) was obtained, wherein the ratio of the repeat unit

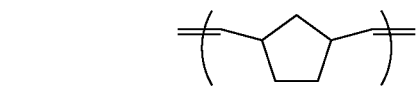

to the repeat unit

was about 1:1.

Next, the number average molecular weight (Mn) of Oligomer (V) was determined, and the result is shown in Table 1.

TABLE 1

| | Preparation Example 1 | Preparation Example 2 | Preparation Example 3 | Preparation Example 4 | Preparation Example 5 |
|---|---|---|---|---|---|
| VNB (g) | 73.6 | 73.6 | 88.3 | 29.4 | 3 |
| NB (g) | 57.7 | 57.7 | 69.3 | 23.06 | 2.36 |

TABLE 1-continued

|  | Preparation Example 1 | Preparation Example 2 | Preparation Example 3 | Preparation Example 4 | Preparation Example 5 |
|---|---|---|---|---|---|
| α-olefin | 1-hexene | 1-hexene | 1-hexene | 1-hexene | 1-hexene |
| α-olefin (mol %) | 50 | 30 | 10 | 5 | 1 |
| number average molecular weight (Mn) | 1,033 | 1,433 | 3,089 | 4,916 | 11,017 |

Composition

Example 1

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (I) was obtained.

Example 2

Oligomer (I) (100 parts by weight) of Preparation Example 1, polyphenylene oligomer having terminal vinylbenzyl groups (manufactured and sold by Mitsubishi Gas Chemical with a trade No. of OPE-2st (with a number-average molecular weight of about 1,200)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (II) was obtained.

Example 3

Oligomer (I) (100 parts by weight) of Preparation Example 1, polyphenylene oligomer having terminal vinylbenzyl groups (manufactured and sold by Mitsubishi Gas Chemical with a trade No. of OPE-2st (with a number-average molecular weight of about 1,200)) (30 parts by weight), ethoxylated pentaerythritol triacrylate (manufactured and sold by Sartomer with a trade No. of SR494) (10 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (III) was obtained.

Example 4

Oligomer (I) (100 parts by weight) of Preparation Example 1, polybutadiene having terminal acryloyl groups (PB, manufactured and sold by Evonik Corporation with a trade No. of POLYVEST® EP-AT-100 (with a number-average molecular weight of about 3,716)) (50 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (IV) was obtained.

Example 5

Oligomer (II) (100 parts by weight) of Preparation Example 2, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene 90 parts by weight). After mixing completely, Composition (V) was obtained.

Example 6

Polyphenylene ether having terminal methylacryloyl groups (PPE, manufactured and sold by SABIC with a trade No. of SA9000 (with a number-average molecular weight of about 2,300)) (40 parts by weight), ethoxylated pentaerythritol triacrylate (manufactured and sold by Sartomer with a trade No. of SR494) (40 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene 90 parts by weight). After mixing completely, Composition (VI) was obtained.

Example 7

Polybutadiene having terminal acryloyl groups (PB, manufactured and sold by Evonik Corporation with a trade No. of POLYVEST® EP-AT-100 (with a number-average molecular weight of about 3,716)) (33.3 parts by weight), ethoxylated pentaerythritol triacrylate (manufactured and sold by Sartomer with a trade No. of SR494) (33.3 parts by weight), meth)acrylate compound (manufactured and sold by Shin-Nakamura Chemical Co., Ltd. with a trade No. of BPE-500) (33.3 parts by weight), and 2-octanedion,1-[4-(phenylthio) phenyl]-,2-(O-benzoyloxime)) (manufactured and sold by BASF with a trade No. OXE-01) (3 parts by weight) were added into a reaction bottle, and then dissolved in toluene (30 parts by weight). After mixing completely, Composition (VII) was obtained.

Example 8

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (10 parts by weight), polybutadiene having terminal acryloyl groups (PB, manufactured and sold by Evonik Corporation with a trade No. of POLYVEST® EP-AT-100 (with a number-average molecular weight of about 3,716)) (10 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (VIII) was obtained.

Example 9

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (40 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (IX) was obtained.

Example 10

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (X) was obtained.

Example 11

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), and 2-octanedion,1-[4-(phenylthio) phenyl]-,2-(O-benzoyloxime)) (manufactured and sold by BASF with a trade No. OXE-01) (3 parts by weight) were added into a reaction bottle, and then dissolved in toluene (90 parts by weight). After mixing completely, Composition (XI) was obtained.

Example 12

Oligomer (III) (100 parts by weight) of Preparation Example 3, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), and 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (XII) was obtained.

Example 13

Oligomer (IV) (100 parts by weight) of Preparation Example 4, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), and 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (XIII) was obtained.

Example 14

Oligomer (V) (100 parts by weight) of Preparation Example 5, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion,1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (1 part by weight) were added into a reaction bottle, and then dissolved in toluene (90 parts by weight). After mixing completely, Composition (XIV) was obtained.

Example 15

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion, 1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (0.5 part by weight) were added into a reaction bottle, and then dissolved in toluene (90 parts by weight). After mixing completely, Composition (XV) was obtained.

Example 16

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion, 1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (2 part by weight) were added into a reaction bottle, and then dissolved in toluene (90 parts by weight). After mixing completely, Composition (XVI) was obtained.

Example 17

Oligomer (I) (100 parts by weight) of Preparation Example 1, polyphenylene ether having terminal methylacryloyl groups (PPE, manufactured and sold by SABIC with a trade No. of SA9000 (with a number-average molecular weight of about 2,300)) (20 parts by weight), polybutadiene having terminal acryloyl groups (PB, manufactured and sold by Evonik Corporation with a trade No. of POLYVEST® EP-AT-100 (with a number-average molecular weight of about 3,716)) (20 parts by weight), 2-octanedion, 1-[4-(phenylthio) phenyl]-,2-(O-benzoyloxime)) (manufactured and sold by BASF with a trade No. OXE-01) (3 parts by weight), dicumyl peroxide (1 part by weight), and photo-acid generator (manufactured and sold by BASF with a trade No. Irgacure PAG103) (2.5 part by weight) were added into a reaction bottle, and then dissolved in toluene (90 parts by weight). After mixing completely, Composition (XVII) was obtained.

Next, Compositions (I)-(XVII) were coated on a copper foil (manufactured and sold by Furukawa Circuit Foil Co., Ltd.) by spin coating individually. Next, the copper foil coated with the composition was heated at 100° C. for 30 min. Next, the results were irradiated by an ultraviolet light source (with a broadband exposure) having dosed energy 600 mj/cm2. After irradiation, the results were developed by dipping into cyclopentanone. After washing with isopropanol, the results were heated at 180° C.-230° C. for 2 hr, and then Insulating films (I)-(XVII) were obtained.

Next, the insulating films (I)-(XVII) were observed to determine whether Insulating films (I)-(XVII) were patterned or not. Furthermore, the dielectric constant, dielectric dissipation factor (measured at 60 GHz) and solder resistance of Insulating films (I)-(XVII) were measured, and the results are shown in Tables 2 and 3. The solder resistance of Insulating films (I)-(XVII) was measured according to ASTM D 543 (at 288° C.).

TABLE 2

| | Example 1 | Example 2 | Example 3 | Example 4 | Example 5 | Example 6 | Example 7 | Example 8 | Example 9 |
|---|---|---|---|---|---|---|---|---|---|
| Oligomer (I) (parts by weight) | 100 | 100 | 100 | 100 | 0 | 0 | 0 | 100 | 100 |
| Oligomer (II) (parts by weight) | 0 | 0 | 0 | 0 | 100 | 0 | 0 | 0 | 0 |
| OPE-2st (parts by weight) | 0 | 20 | 30 | 0 | 0 | 0 | 0 | 0 | 0 |
| SA9000 (parts by weight) | 20 | 0 | 0 | 0 | 20 | 40 | 0 | 10 | 20 |
| Polyvest-At100 (parts by weight) | 20 | 20 | 0 | 50 | 20 | 0 | 33.3 | 10 | 40 |
| SR494 (parts by weight) | 0 | 0 | 10 | 0 | 0 | 40 | 33.3 | 0 | 0 |
| BPE-500 (parts by weight) | 0 | 0 | 0 | 0 | 0 | 0 | 33.3 | 0 | 0 |
| OXE-01 (parts by weight) | 3 | 3 | 3 | 3 | 3 | 3 | 3 | 3 | 3 |

TABLE 2-continued

|  | Example 1 | Example 2 | Example 3 | Example 4 | Example 5 | Example 6 | Example 7 | Example 8 | Example 9 |
|---|---|---|---|---|---|---|---|---|---|
| dicumyl Peroxide (parts by weight) | 1 | 1 | 1 | 1 | 1 | 1 | 0 | 1 | 1 |
| PAG-103 (parts by weight) | 1 | 1 | 1 | 1 | 1 | 1 | 0 | 1 | 1 |
| Patternable | Yes | Yes | Yes | Yes | Yes | No | Yes | No | Yes |
| Curing temp. (° C.) | 180 | 180 | 180 | 180 | 180 | 180 | 180 | 180 | 180 |
| Dk/Df (60 GHz) | 2.5/0.0072 | 2.5/0.0073 | 2.6/0.0088 | 2.6/0.0075 | 2.6/0.0073 | 2.8/0.018 | 2.9/0.03 | 2.6/0.0072 | 2.6/0.0076 |
| Solder resist (288° C./10 Sec) | Pass | Pass | Pass | Pass | Pass | Fail | Fail | Fail | Fail |

TABLE 3

|  | Example 10 | Example 11 | Example 12 | Example 13 | Example 14 | Example 15 | Example 16 | Example 17 |
|---|---|---|---|---|---|---|---|---|
| Oligomer (I) (parts by weight) | 100 | 100 | 0 | 0 | 0 | 100 | 100 | 100 |
| Oligomer (II) (parts by weight) | 0 | 0 | 0 | 0 | 0 | 0 | 0 | 0 |
| Oligomer (III) (parts by weight) | 0 | 0 | 100 | 0 | 0 | 0 | 0 | 0 |
| Oligomer (IV) (parts by weight) | 0 | 0 | 0 | 100 | 0 | 0 | 0 | 0 |
| Oligomer (V) (parts by weight) | 0 | 0 | 0 | 0 | 100 | 0 | 0 | 0 |
| OPE-2st (parts by weight) | 0 | 0 | 0 | 0 | 0 | 0 | 0 | 0 |
| SA9000 (parts by weight) | 20 | 20 | 20 | 20 | 20 | 20 | 20 | 20 |
| Polyvest-At100 (parts by weight) | 20 | 20 | 20 | 20 | 20 | 20 | 20 | 20 |
| SR494 (parts by weight) | 0 | 0 | 0 | 0 | 0 | 0 | 0 | 0 |
| BPE-500 (parts by weight) | 0 | 0 | 0 | 0 | 0 | 0 | 0 | 0 |
| OXE-01 (parts by weight) | 0 | 3 | 3 | 3 | 3 | 3 | 3 | 3 |
| dicumyl Peroxide (parts by weight) | 1 | 0 | 1 | 1 | 1 | 1 | 1 | 1 |
| PAG-103 (parts by weight) | 1 | 0 | 1 | 1 | 1 | 0.5 | 2 | 2.5 |
| Patternable | No | No | Yes | Yes | No | Yes | Yes | Yes |
| Curing temp. (° C.) | 180 | 230 | 180 | 180 | 180 | 180 | 180 | 180 |
| Dk/Df (60 GHz) | 2.5/0.0072 | 2.9/0.009 | 2.5/0.0074 | 2.5/0.0076 | 2.6/0.0089 | 2.6/0.0075 | 2.6/0.0073 | 2.8/0.01 |
| Solder resist (288° C./10 Sec) | Pass | Fail | Pass | Pass | Pass | Pass | Pass | Pass |

As shown in Tables 2 and 3, the insulating films prepared from the compositions of the disclosure can pass the solder resistance test and can stably maintain the designed patterns. Furthermore, the insulating films prepared from the compositions of the disclosure exhibit a relatively low dielectric constant (less than or equal to 2.6 (at 60 GHz) and a relatively low dissipation factor (less than or equal to 0.0088 (at 60 GHz)), thereby serving as a good material for a high-frequency substrate.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A composition, comprising:
 (a) 100 parts by weight of oligomer of Formula (I)

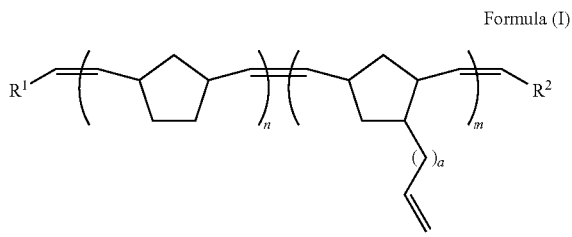
Formula (I)

wherein $R^1$ and $R^2$ are independently hydrogen or

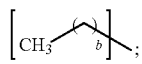

$R^1$ is not hydrogen when $R^2$ is hydrogen; a is 0 or 1; b is 0, 1, 2, 3, 4, 5, or 6; n≥5; m≥1; and the repeat unit

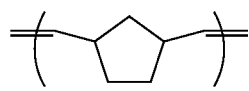

and the repeat unit

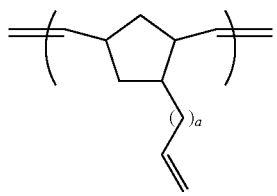

are arranged in a random or block fashion;
 (b) 20-50 parts by weight of polymer having at least two reactive functional groups, wherein the reactive functional group is a reactive-double-bond-containing functional group;
 (c) 1-5 parts by weight of photoinitiator;
 (d) 0.5-2 parts by weight of thermal initiator; and
 (e) 0.5-2 parts by weight of photoacid generator.

2. The composition as claimed in claim 1, wherein the oligomer has a number-average molecular weight from 1,000 to 5,000, m is from 1 to 25, and n is 5 to 40.

3. The composition as claimed in claim 1, wherein the ratio of n to m is 95:5 to 50:50.

4. The composition as claimed in claim 1, wherein the $R^1$ and $R^2$ are independently hydrogen, methyl, ethyl, n-propyl, n-butyl, n-pentyl, or n-hexyl; and $R^1$ is not hydrogen when $R^2$ is hydrogen.

5. The composition as claimed in claim 1, wherein the polymer having at least two reactive functional groups is polyether having at least two reactive functional groups, polynorbornene having at least two reactive functional groups, polyphenylene ether having at least two reactive functional groups, polypropylene having at least two reactive functional groups, polybutadiene having at least two reactive functional groups, or a combination thereof.

6. The composition as claimed in claim 1, wherein the reactive functional group is acryloyl group, allyl group, vinylbenzyl group, methylacryloyl group, propargyl group, cyanoallyl group, or a combination thereof.

7. The composition as claimed in claim 1, wherein the polymer having at least two reactive functional groups has a number-average molecular weight from about 1,000 to 200,000.

8. The composition as claimed in claim 1, wherein the polymer having at least two reactive functional groups is polyphenylene ether having at least two methylacryloyl groups, polyphenylene ether having at least two vinylbenzyl groups, or polybutadiene having at least two acryloyl groups.

9. The composition as claimed in claim 1, wherein the photoinitiator is benzoin-based compound, acetophenone-based compound, thioxanthone-based compound, ketal compound, benzophenone-based compound, a-aminoacetophenone compound, acylphosphineoxide compound, biimidazole-based compound, triazine-based compound, or a combination thereof.

10. The composition as claimed in claim 1, wherein the thermal initiator is azo compound, cyanovaleric-acid-based compound, peroxide, or a combination thereof.

11. The composition as claimed in claim 1, wherein the photoacid generator comprises ionic photoacid generator, non-ionic photoacid generator, polymeric photoacid generator, or a combination thereof.

12. The composition as claimed in claim 1, wherein the photoacid generator comprises onium salt, selenium salt, phosphonium salt, iodinium, sulfonium salt, organic halogen compound, O-nitrobenzylsulfonate compound, N-iminosulfonate compound, N-imidosulfonate compound, diazosulfonate compound, sulfonamide compound, diazodisulfonate compound, disulfone compound, or a combination thereof.

13. The composition as claimed in claim 1, further comprising:
 (f) solvent.

14. The composition as claimed in claim 13, wherein the solvent is acetone, methyl ethyl ketone, 1-methoxy-2-propanol, 1,2-propanediol monomethyl ether acetate, toluene, xylene, dimethyl formamide, N-methyl-2-pyrrolidone, dimethyl sulfoxide, or a combination thereof.

15. An insulating material, which is a cured product of the composition as claimed in claim 1.

16. A method for preparing an insulating material, comprising:
 subjecting the composition as claimed in claim 1 to a coating process to form a coating;
 subjecting the coating to a first thermal treatment;
 irradiating the coating with a light source; and
 subjecting the coating to a second thermal treatment after irradiation.

17. The method as claimed in claim 16, wherein the first thermal treatment has a temperature from 70 to 120° C.

18. The method as claimed in claim 16, wherein the light source has a wavelength from 190 nm to 430 nm.

19. The method as claimed in claim 16, wherein the second thermal treatment has a temperature from 100 to 250° C.

20. The method as claimed in claim 16, after irradiation, further comprising:
    subjecting the coating to a developing process.

* * * * *